United States Patent

[11] 3,532,188

[72] Inventor Norbert Kelz
 Welland, Ontario, Canada
[21] Appl. No. 803,844
[22] Filed March 3, 1969
[45] Patented Oct. 6, 1970
[73] Assignee By mesne assignments to Hyster Canada
 Limited, Malton, Ontario, Canada, a
 corporation of Canada

[54] MANUALLY OPERATED BRAKE FOR HAND TRUCK
 8 Claims, 7 Drawing Figs.
[52] U.S. Cl. .................................................. 188/21,
 188/29, 188/119
[51] Int. Cl. .................................................. B60t 1/04
[50] Field of Search ........................... 188/1(D), 21,
 29, 57, 119; 180/19(H); 280/43.12; 16/35

[56] References Cited
 UNITED STATES PATENTS
 2,775,313 12/1956 Kurvers et al............ 188/21X
 3,074,516 1/1963 Wood...................... 188/119
 FOREIGN PATENTS
 272,537 3/1951 Switzerland .............. 16/35

Primary Examiner—George E. A. Halvosa
Attorney—Chittick, Pfund, Birch, Samuels and Gauthier ABSTRACT: The invention is directed to a manually operated lever and cam system whereby a very substantial force can be developed to press a brakeshoe against a wheel. The handle normally utilized for propelling and guiding the truck serves as the lever. The mechanism permits easy engagement or disengagement of the brake regardless of the handle position.

Patented Oct. 6, 1970

Inventor:
Norbert Keiz,
Chittick, Pfund, Birch, Samuels & Gauthier
Attorneys

Patented Oct. 6, 1970

Inventor:
Norbert Kelz,
Chittick, Pfund, Birch, Samuels & Gauthier Attorneys

MANUALLY OPERATED BRAKE FOR HAND TRUCK

BRIEF SUMMARY OF THE INVENTION

The invention herein disclosed is a brake mechanism which is adapted to be actuated through limited angular movement of a pivoted handle. It has found ready application in connection with that type of material handling truck now known in the trade as a low-lift hand truck. This type of truck usually comprises a pair of spaced forks with wheels at their free rear ends and a third wheel at the front end connected to a pivoted handle used by the operator in guiding the truck directionally and for applying a pushing or pulling force.

In the ordinary operation of such trucks, the load to be moved is placed on a pallet held in somewhat raised position by parallel stringers. The forks of the truck are then moved in under the pallet. Linkages operated by the operator's foot causes the forks to rise under the pallet to lift the pallet and supporting stringers clear of the floor. The truck is then manually propelled by the operator and guided by the handle connected to the front steering wheel which is turnable usually through 90° in both directions, right and left. At times, to maintain proper control of the truck, it may be necessary to apply a brake. The need for application of the brake may arise suddenly; therefore, the brake mechanism preferably should be such that the operator may apply it immediately without regard to the particular position of the handle at that instant.

More specifically, the invention comprises a brakeshoe normally held in off-position by a spring and located closely adjacent the outer periphery of the front wheel. The brakeshoe has attached thereto a rod extending upwardly to a position just below a cam that is rotatably mounted on the same pivot that carries the handle. The cam when rotated through a small angle by the handle forces the rod and brakeshoe downwardly to engage the wheel. Special cam engaging means is positioned within the lower part of the handle which may be moved by the operator with little effort to lock the handle to the cam whenever braking action is required. This locking engagement of the handle with the cam may take place regardless of the position the handle happens to be in when the operator finds it necessary to actuate the brake. Once the cam has been operatively connected to the handle, then a small angular movement of the handle either upwardly or downwardly will rotate the cam through a sufficient angle to cause the brake to be applied. Because of the length of the handle and the dimensions of the cam, sufficient leverage is available so that the operator using only limited manual power, may force the brakeshoe against the wheel with whatever pressure is necessary to control the truck movement.

Thus, it will be understood that the construction hereinafter described in detail will enable the operator to apply the brake to any extent required whether he is pushing or pulling the truck and regardless of the vertical or lateral position of the handle.

BRIEF DESCRIPTION OF THE SEVERAL VIEWS OF THE DRAWING

FIG. 6 is a fragmentary view to enlarged scale of part of FIG. 2 showing the handle in one position of operating connection with the cam. The cam has been rotated by the handle sufficiently to apply the brake.

FIG. 7 is a fragmentary view to enlarged scale of part of FIG. 3 showing the brake in applied position when the handle has been pushed beyond vertical in the direction of the truck.

DETAILED DESCRIPTION OF A PREFERRED EMBODIMENT

Figure 1:
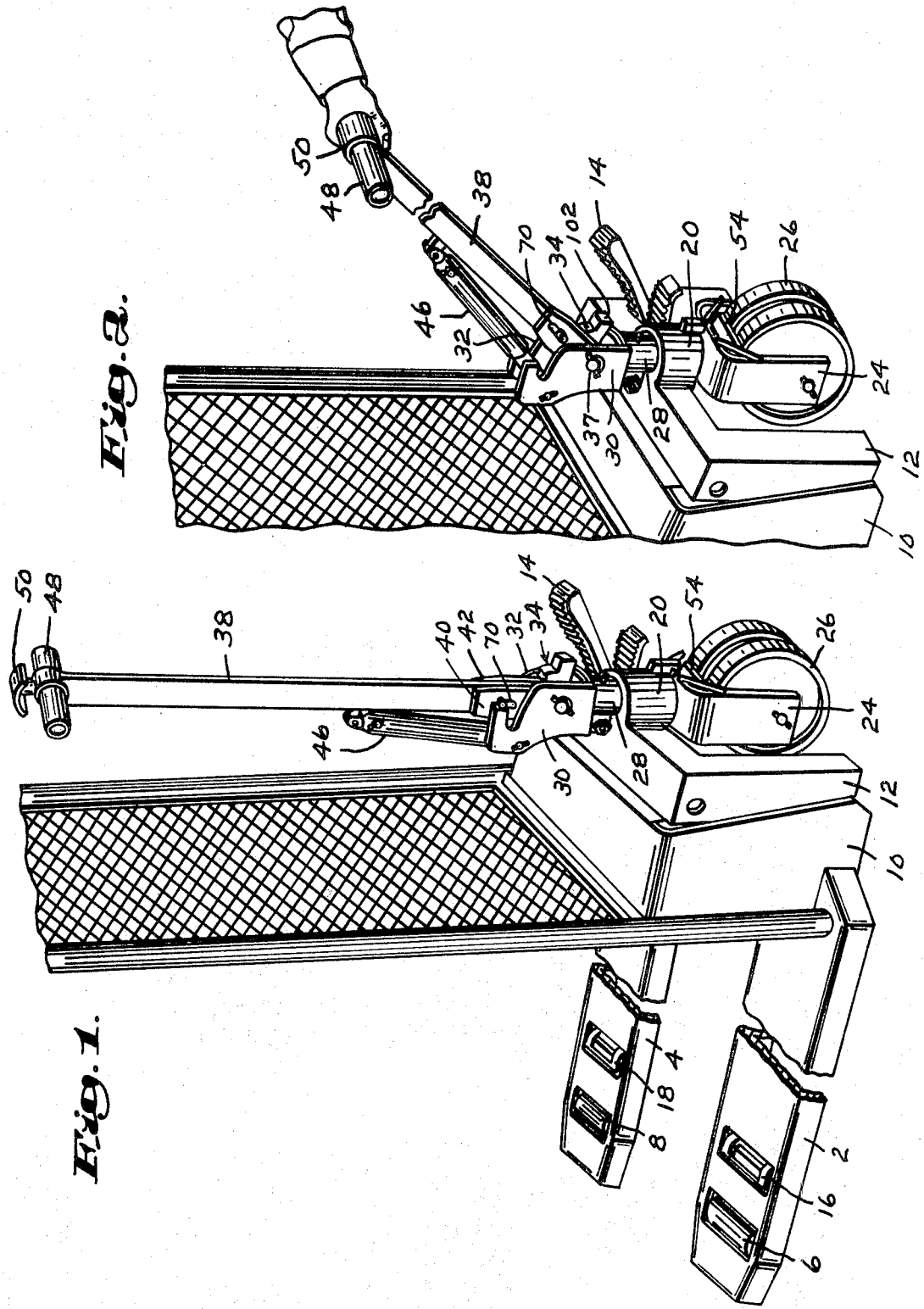
FIG. 1 is a perspective view of one-type of conventional low-lift hand truck in which the braking mechanism has been incorporated. The handle and brake are in off position.
Figure 2:
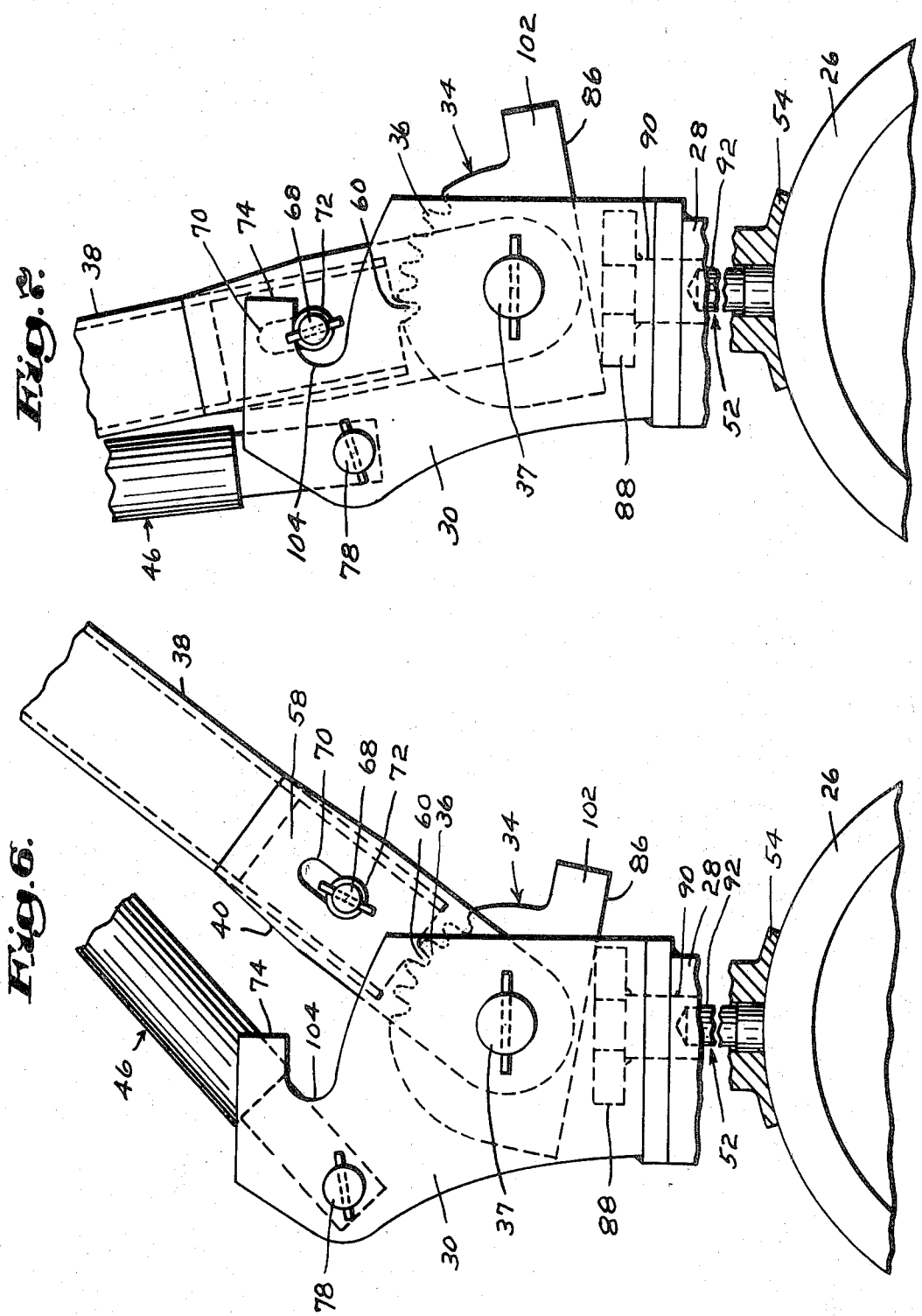
FIG. 2 shows the handle in a typical operating position with the handle and brake actuating cam connected for brake application.
Figure 3:
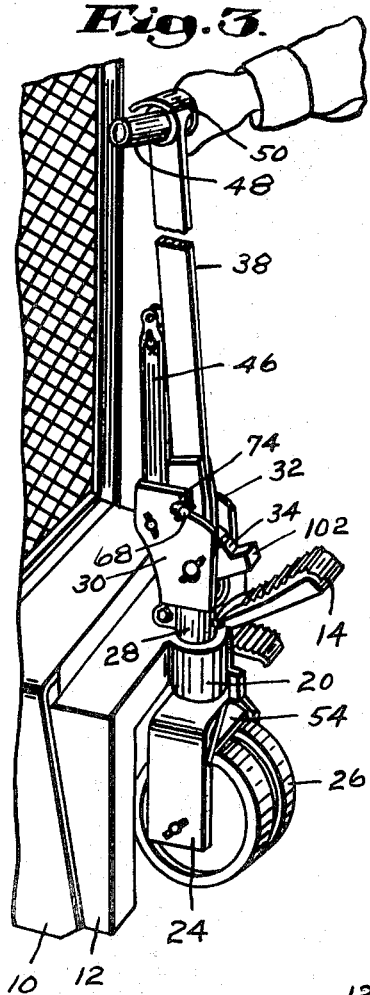
FIG. 3 shows the handle in vertical position with the cam engaged whereby the brake may be applied by pushing the handle toward the rear of the truck.

Referring first to FIG. 1, there is shown therein a conventional low-lift hand truck. This comprises a pair of parallel forks 2 and 4 supported at their rear ends by wheels 6 and 8 and connected at their forward ends to a frame 10. The frame 10 is connected to a front wheel frame 12 by suitable conventional linkages not shown whereby when the treadle 14 is actuated, the wheels 6 and 8 will swing downwardly about pivots 16 and 18 thereby to raise the forks 2 and 4 and the frame 10 with respect to frame 12 a sufficient distance to raise from the floor the pallet under which the forks have been placed.

Figure 4:
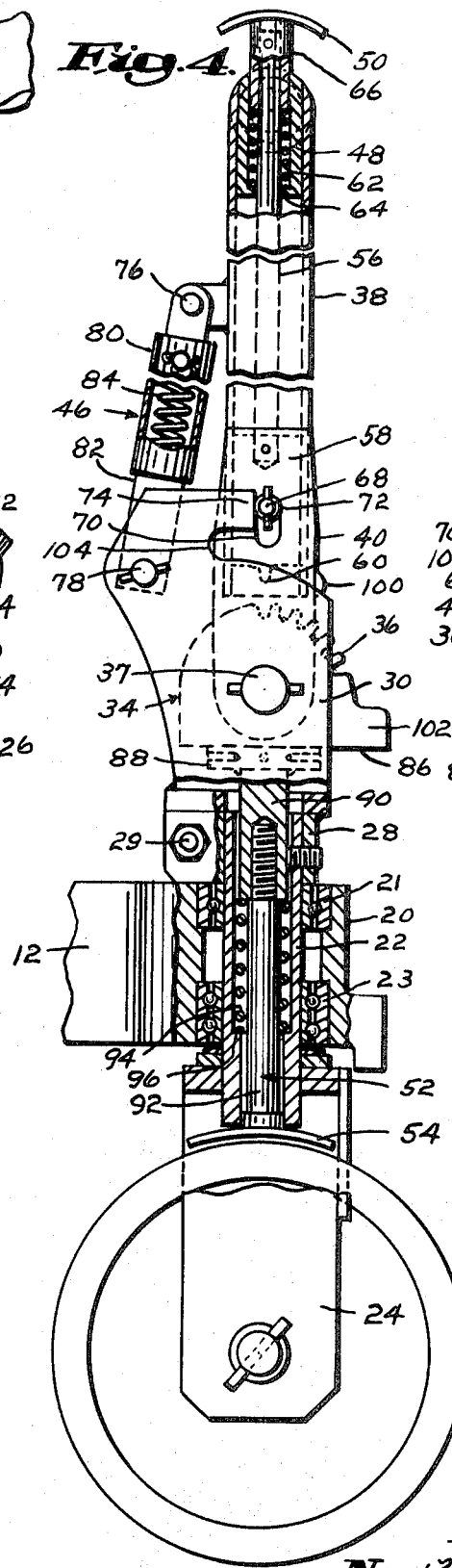
FIG. 4 is an enlarged side elevation of the handle, cam and brake mechanism showing in greater detail the operative elements.
Figure 5:
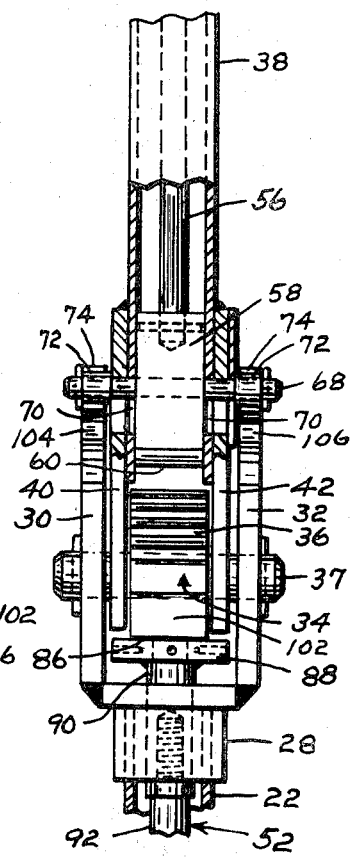
FIG. 5 is a front elevation of part of FIG. 4.

Referring now to FIGS. 1, 4 and 5, the front wheel frame 12 has a forwardly extending boss 20 in which is mounted in bearings 21 and 23 a steering column in the form of a tubular fork spindle 22 having on its lower end the fork 24 which in turn supports the front wheel 26. A split collar 28 is clamped by bolt 29 to the upper end of the fork spindle 22. A pair of upwardly extending elements preferably in the form of sideplates 30 and 32 are welded to collar 28. Between these sideplates is a cam 34 having depressions therein preferably in the form of teeth 36 about its upper periphery. Cam 34 is mounted on a pivot pin 37 carried by plates 30 and 32. A handle 38 has on its lower end a pair of spaced ears 40 and 42 which are also pivotally mounted on pin 37. The ears 40 and 42, as seen in FIG. 5, are located between plates 30 and 32 and the cam 34.

A tension spring mechanism 46, which will be explained in more detail hereinafter, normally holds the handle 38 in upright position as shown in FIG. 1 and 4 but permits swinging of the handle downwardly for movement and guidance of the truck.

Handle 38 has a crosswise extending handgrip portion 48 at its upper end. A brake lever 50 extends upwardly beyond the end of handle 38 a short distance. Movement of lever 50 toward the handle 38 regardless of the angular position of handle causes, by means to be explained hereinafter, immediate engagement of the handle with the cam 34. Then small angular movement of handle 38 about pivot 37 causes sufficient rotation of cam 34 to actuate a brakeshaft 52 extending vertically down through spindle 22 so that a brakeshoe 54 on the lower end thereof is forced into contact with the surface of wheel 26.

Handle 38 is in the form of a tubular member square in section. As previously explained, the sideplates 40 and 42 are pivotally mounted on pivot pin 37 whereby the handle 38 may swing in a vertical arc and whereby lateral movement of handle 38 when swung toward the horizontal on pivot 37 will cause corresponding rotation of fork spindle 22 and the wheel 26 about the vertical axis.

Cam 34, also mounted on pin 37, has about its upper forward quadrant a plurality of teeth 36 which are adapted to be engaged in any selected handle position by movable means within the handle 37 which will now be described. A rod 56 inside handle 38 is connected at its upper end to brake lever 50 and at its lower end to a slide member 58 which comprises a solid block of metal having on its lower end a crosswise extending tooth 60. A compression spring 62 located between inwardly turned flange 64 and the lower end of tube 66 that extends downwardly from brake lever 50 normally maintains the rod 56, lever 50 and the slide 58 in up position where the tooth 60 is completely clear of the teeth 36 on cam 34.

A crosswise extending pin 68 passes through slide 58 and extends outwardly through oval apertures 70 in opposite sides of the handle 38. Preferably, the outer ends of pin 68 carry bushings 72 which are in vertical alignment with the stop portions 74 of the sideplates 30 and 32 to limit movement of handle 38 toward the truck.

The tension spring device 46 is pivotally connected at 76 to the rear of handle 38 and pivotally connected at 78 between the rear portions of sideplates 30 and 32. This tension spring device 46 comprises a pair of telescoping tubes 80 and 82 within which is enclosed a tension spring 84 having its ends fastened at the ends of the tubes. The obvious effect of this arrangement is to hold the handle in a vertical position after it has been released by the operator.

From the foregoing, it should be apparent that when the brake lever 50 is depressed against the slight resistance of spring 62, the tooth 60 will enter into position between any two adjacent teeth 36 on the cam 34 depending upon the position of lever 38 at the time the brake lever 50 is depressed. As soon as engagement is made between tooth 60 and a pair of teeth on cam 34, it is obvious that any movement of lever 38 up or down will cause corresponding rotation of cam 34. The bottom 86 of cam 34 is normally horizontal by virtue of its engagement with the upper surface of a plate preferably in the form of a disc 88 which is mounted on the upper end of brakeshaft 52. Brakeshaft 52 comprises a short interiorly threaded shaft 90 to which is screwed another short shaft 92. Shaft 92 has secured on its lower end the brakeshoe 54.

Brakeshoe 54 is closely adjacent wheel 26 and so long as cam 34 is in neutral position is maintained in off position by means of compression spring 94 which presses upwardly against the lower end of shaft 90 and downwardly against an internal lip 96 which is an integral part of the fork spindle 22. Thus rotation of cam 34 through movement of handle 38 will cause downward movement of disc 88 and related brakeshaft 52 in the manner shown in FIG. 6 which causes corresponding application of brakeshoe 54 to wheel 26.

From the foregoing description, it will be apparent that regardless of the position of handle 38, the operator may make immediate connection of tooth 60 with teeth 36 by depressing brake lever 50 against the small resistance of spring 62. Thereafter the movement of the lever 38 up or down through a very small angle of rotation will cause corresponding movements of cam 34 and disc 88 and instant application of brake 54 to wheel 26. Since the lever 38 is long in relation to the effective radius of the cam surface 86 against disc 88, it is easy to apply sufficient pressure of brakeshoe 54 against wheel 26 to lock the wheel against rotation if necessary. Easier pressure will, of course, give whatever control of movement of the truck the operator deems necessary.

Additional features of the present construction will now be described. When the lever 38 has been swung forward to its maximum down position, with tooth 60 free of engagement with teeth 36, a stop 100 located at the lower end of handle 38 will come directly into engagement with a projection 102 which extends forwardly from cam 34. When the lever 38 is in this position, the brake may be actuated by further downward movement of lever 38 without the necessity of bringing tooth 60 into engagement with the teeth 36 of cam 34. As soon as the handle 38 is released by the operator, it will be drawn upwardly to vertical position by the tension spring assembly 46.

In some instances, it might be necessary to apply the brake when the handle is in vertical position. For example, the truck might be advancing toward the operator on a down slope with the handle upright. In such case, the brake can be applied by depressing brake lever 50 to move the pin 68 and related bushings 72 downwardly to a position below stops 74 where the bushings 72 come into alignment with the notches 104 and 106 in the upper portions of plates 30 and 32. In this position, of course, the tooth 60 will be located in the space between the two uppermost teeth 36 of the cam 34. With pin 68 in this down position, the handle 38 may be pushed toward the truck sufficiently to rotate cam 34 counterclockwise, as viewed in FIG. 4, to depress disc 88 thereby to apply brakeshoe 54. The depth of the notches 104 and 106 is sufficiently great so that the brake can be fully applied with the bushings 72 still clear of engagement with the ends of the notches.

When the truck is unattended, the forces present in springs 94, 62 and 84 will result in the handle assuming the position shown in FIGS. 1 and 4.

In summary, the present invention provides means whereby the operator of a manually moved and directed truck may readily apply a brake of adequate power to properly control truck movement regardless of the position of the truck handle and with a minimum of physical effort.

It is intended to cover all changes and modifications of the examples of the invention herein chosen for purposes of the disclosure which do not constitute departures from the spirit and scope of the invention.

I claim:

1. In a manually movable and steerable truck, means for actuating a brakeshoe on the steering wheel of said truck, said means comprising a hollow steering column associated with said wheel, a brakeshoe located above said wheel and having a brake rod extending vertically through said steering column, a plate on the upper end of said brake rod, a cam pivotally mounted on means fixed with respect to said steering column and located in normal position against the upper side of said plate, spring means for constantly urging said brakeshoe to off position and to hold said plate against the underside of said cam, a handle pivotally mounted on the same pivot as said cam and normally free of engagement with said cam and manually actuated means associated with said handle for making engagement of said handle with said cam at the discretion of the operator whereby after engagement of said means with said cam pivotal movement of said handle will cause rotation of said cam sufficient to move said plate downwardly and cause said brakeshoe to engage said wheel.

2. In a manually movable and steerable truck, a brake mechanism comprising a wheel mounted for directional steering about a vertical axis, said wheel mounting comprising an axle, a support for said axle, a tubular vertically extending spindle affixed to said support, bearing means mounting said spindle in rotatable relation to the truck frame, a pair of vertically extending spaced elements affixed to said spindle, a pivot pin extending horizontally between said elements, a cam mounted on said pin between said elements, a handle pivotally mounted on said pin, a plurality of depressions about part of the upper periphery of said cam, a slidable element within said handle having a projection on the lower end adapted to engage within any selected depression in said cam, means extending to the upper end of said handle for manually controlling the position of said slidable element, a breakeshoe located immediately above said wheel, an operating shaft for said brakeshoe extending upwardly through said tubular spindle, means on the upper end of said shaft normally in engagement with the underside of said cam, the configuration of said cam and the means on the upper end of said brakeshoe shaft being such that after said means on the said slidable element has been brought into engagement with a depression of said cam and said handle is thereafter moved about said pivot, said brakeshoe will be forced downwardly to come into engagement with said wheel.

3. The brake mechanism set forth in claim 2 in which the depressions in said cam are in the form of regularly spaced teeth and the projection on the lower end of said slide is in the form of a cooperating tooth adapted to enter between any two of said teeth.

4. The construction set forth in claim 2 in which said slide has attached thereto a rod extending the length of said handle and means on the end of the rod for manual actuation by the operator, and a spring for holding said slide normally in inoperative position.

5. A brake mechanism set forth in claim 2 in which said cam has a flat lower surface and the means engaged by said cam is in the form of a plate on the upper end of said brake shaft, and a spring for constantly urging said plate upwardly to be in engagement with the underside of said cam.

6. The brake construction set forth in claim 2 in which said cam has a forward extension of sufficient length to engage the lower part of said handle when said handle is swung downwardly whereby said cam can be actuated to cause brake operation without engagement of the said projection of said slide with the depressions in said cam.

7. A brake mechanism as set forth in claim 2, said handle having oppositely disposed openings in its side walls ajdacent said slide, a pin mounted in said slide and having its ends extending through said wall openings, the location of said pin with respect to said handle when said projection is not in engagement with said cam depressions being such as to engage stop portions of said spaced elements thereby to limit swinging movement of said handle in the direction of said truck.

8. The brake construction set forth in claim 7 in which the said spaced elements are cut away immediately below said stop portions to form rearwardly extending spaces whereby when said slide is depressed by the operator the ends of said pin will be at the level of said cutaway spaces and whereby said handle may be swung in the direction of said truck thereby to actuate said cam and to apply said brake.